US012300992B1

United States Patent
Wang et al.

(10) Patent No.: US 12,300,992 B1
(45) Date of Patent: May 13, 2025

(54) PV SHUTDOWN SYSTEM WITH MID-CIRCUIT INTERRUPTER

(71) Applicant: FranklinWH Energy Storage Inc., San Jose, CA (US)

(72) Inventors: Tao Wang, Shenzhen (CN); Song Chen, Shenzhen (CN); Lianyan Cai, Shenzhen (CN); Xiaolong Luo, Shenzhen (CN); Gang Xiao, Shenzhen (CN); Yanxiang Wang, Shenzhen (CN); Ke Bi, San Jose, CA (US); Cheung (Gary) Lam, San Jose, CA (US); Douglas Amarhanow, San Jose, CA (US)

(73) Assignee: FranklinWH Energy Storage Inc., San Jose, CA (US)

( * ) Notice: Subject to any disclaimer, the term of this patent is extended or adjusted under 35 U.S.C. 154(b) by 0 days.

(21) Appl. No.: 18/932,445

(22) Filed: Oct. 30, 2024

Related U.S. Application Data

(60) Provisional application No. 63/695,998, filed on Sep. 18, 2024.

(51) Int. Cl.
*H02H 7/00* (2006.01)
*H02H 7/20* (2006.01)
*H02J 3/38* (2006.01)

(52) U.S. Cl.
CPC ............... *H02H 7/20* (2013.01); *H02J 3/38* (2013.01); *H02J 2300/26* (2020.01)

(58) Field of Classification Search
None
See application file for complete search history.

(56) References Cited

U.S. PATENT DOCUMENTS

| | | | |
|---|---|---|---|
| 2014/0183953 A1* | 7/2014 | Harrison | H02M 7/4807 307/52 |
| 2017/0324269 A1* | 11/2017 | Lee | H01L 31/0504 |
| 2018/0048161 A1* | 2/2018 | Porter | H02J 3/388 |
| 2018/0062379 A1* | 3/2018 | Zhu | H02J 3/381 |
| 2024/0388101 A1* | 11/2024 | Adapa | H02J 3/46 |

\* cited by examiner

*Primary Examiner* — Stephen W Jackson
(74) *Attorney, Agent, or Firm* — ANOVA LAW GROUP, PLLC

(57) ABSTRACT

A photovoltaic (PV) shutdown system for a PV power generation system includes a mid-circuit interrupter (MCI) controller and at least one MCI with two terminals. The two terminals of the at least one MCI are arranged for connection with the MCI controller, a maximum power point tracking (MPPT) system, and a PV string. The PV string includes PV modules connected in series. The MCI controller is arranged to turn on the at least one MCI by providing supply power and turn off the at least one MCI by terminating the supply power.

17 Claims, 7 Drawing Sheets

PV SHUTDOWN SYSTEM WITH MID-CIRCUIT INTERRUPTER

CROSS-REFERENCE TO RELATED APPLICATION

This application claims priority to U.S. provisional patent application Ser. No. 63/695,998, filed Sep. 18, 2024, the entire content of which is incorporated herein by reference.

TECHNICAL FIELD

The present disclosure generally relates to the field of photovoltaic (PV) technology and, more particularly, relates to PV shutdown systems with a mid-circuit interrupter (MCI) and methods thereof.

BACKGROUND

Installation of solar PV power generation systems (or PV systems) has been popular at residential and non-residential sites. PV systems contain a number of PV strings. Each PV string has PV modules connected in series. The connected PV modules can create an electric shock hazard when the maximum voltage at some point exceeds the safe level. To protect fire fighters and other first responders who may have to get on a roof where PV systems are installed, state and local electric codes require rapid shutdown functions, such as that set by the National Electrical Code (NEC) article 690.12.

The rapid shutdown functions can be implemented by a module-level shutdown device (MLSD) or a mid-circuit interrupter (MCI). An MLSD can have two power supply terminals and two switch terminals. The power supply terminals are connected in parallel to a PV module and powered by the PV module. The switch terminals are connected in series in a PV string circuit. An MCI has two terminals and is connected in series in a PV string circuit.

Compared to an MLSD, an MCI has fewer terminals and higher reliability, and the MCI quantity needed for a PV string is smaller than the MLSD quantity for the same PV string. Thus, MCIs may enhance the system reliability and reduce the cost.

However, as current MCIs do not report their status to a PV system, the PV system does not know which MCI becomes defective or fails. Further, when an MCI in a PV string experiences electrical breakdown, high voltage can occur at some point in the PV string, which creates risks of electric shock. Further, there is no mechanism of thermal protection at an MCI. An MCI can get overheated and become a fire hazard. In addition, the output of current PV systems is fixed and cannot be automatically adjusted. When more MCIs are connected in series or the line impedance becomes large, the driving current cannot be automatically increased. Then, the driving current may be insufficient. On the other hand, when the number of MCIs is small and the driving current cannot be automatically decreased, it can result in excessive power loss. Additionally, MCIs are usually installed under PV modules on a roof of a building. It is difficult to locate a faulty one among a number of MCIs when a PV system needs to be repaired.

The disclosed systems and methods are directed to solve the problems set forth above and other problems.

BRIEF SUMMARY OF THE DISCLOSURE

In one aspect of the present disclosure, a PV shutdown system for a PV power generation system includes an MCI controller and at least one MCI with two terminals. The two terminals of the at least one MCI are arranged for connection with the MCI controller, a maximum power point tracking (MPPT) system, and a PV string. The PV string includes PV modules connected in series. The MCI controller is arranged to turn on the at least one MCI by providing supply power and turn off the at least one MCI by terminating the supply power.

In another aspect of the present disclosure, a method for a PV shutdown system includes supplying power to a MCI by an MCI controller to turn on the MCI or stopping supplying power to the MCI to turn off the MCI; in response to supplying power to the MCI or stopping supplying power to the MCI, waiting for a predetermined period of time; and after the predetermined period of time elapses, sending an instruction to the MCI. The instruction directs the MCI to detect the working status of the MCI.

In another aspect of the present disclosure, a PV power generation system includes an MPPT system, an MCI with two terminals, an MCI controller, and a PV string. The PV string includes PV modules connected in series. The two terminals of the MCI are arranged for connection with the MCI controller, the MPPT system, and the PV string. The MCI controller is arranged to turn on the MCI by providing supply power and turn off the MCI by terminating the supply power.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 1:
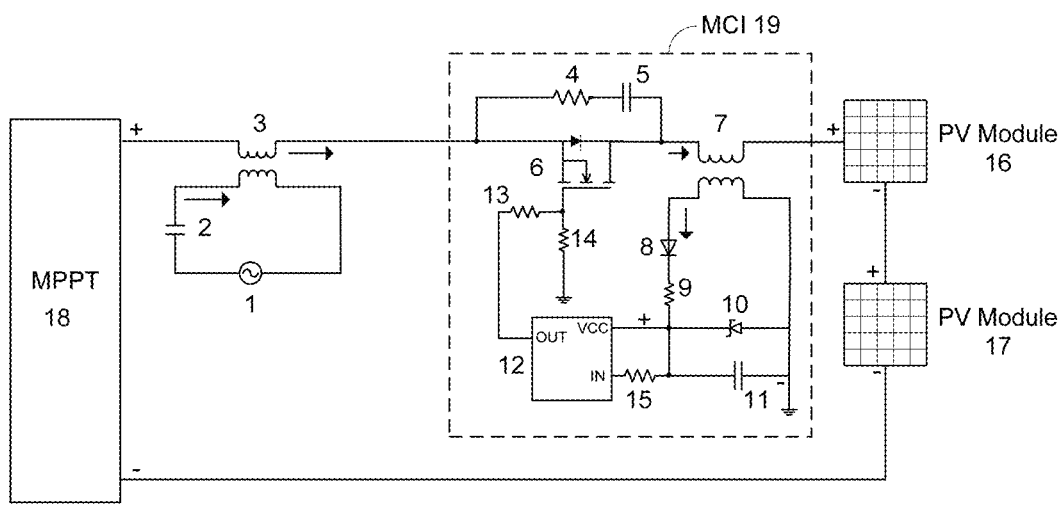
FIG. 1 shows schematically a PV power generation system with an MCI.

FIG. 1 illustrates schematically a PV power generation system 20. The PV power generation system 20 includes PV modules 16 and 17, a maximum power point tracking (MPPT) system 18, and an MCI 19. After the MPPT system 18 starts working, a switch transistor 6 remains in off state, and an MCI controller controls a high-frequency power generator 1 to generate a high-frequency current signal i. The current signal i is injected into the PV DC bus circuit through an isolation capacitor 2 and a coupling transformer 3. The current signal i passes through a bypass composed of a resistor 4 and a capacitor 5 and a body diode of the switch transistor 6. Then the current signal i is coupled on the secondary side through a coupling transformer 7 to generate a current i2. The current i2 passes through a voltage stabilizing circuit containing a rectifier diode 8, a resistor 9, a voltage regulator tube 10, and a capacitor 11. The current i2 passes through a resistor 15 and provides power to a circuit 12. At this time, the input of the IC 12 is at a high level, and the output of the IC 12 is a high-level driving signal. After passing through a resistor 13, the driving signal reaches the gate pole of the switch transistor 6. The switch transistor 6 is turned on, the PV modules 16 and 17 are connected to the MPPT system 18, and the PV power generation system 20 is in operational mode.

When the high-frequency power generator 1 stops generating the high-frequency current signal i, the power supply of the MCI 19 is turned off. Then, the IC 12 loses power, and the gate pole drive signal of the switch transistor 6 has a low level, which turns off the switch transistor 6. That is, the MCI 19 is shut down. Then, the PV modules 16 and 17 become disconnected from the MPPT system 18.

As illustrated above, turning on and shutting down the MCI 19 is relatively easy and simple. It only needs to control the high-frequency power generator, which injects or stops the current signal i, to switch between the on state and off state of the MCI. When there are multiple MCIs connected in series in the PV power circuit, the high-frequency power generator controls the on state and off state of these MCIs. But the system 20 as shown in FIG. 1 does not detect the working status of the MCI 19. The term "working status", as used herein, indicates whether an MCI works properly. When there are multiple MCIs connected in series in a PV string, such a system cannot ascertain which MCI becomes defective. If one of the MCIs experiences breakdown, PV modules connected with the damaged MCI can be connected together, creating a DC open circuit voltage beyond a safe level. Thus, it is desirable to detect the working status of the MCI, report a faulty MCI to a monitoring unit, and notify a user of a hazardous incident. It facilitates implementing safety protection measures.

Figure 2:
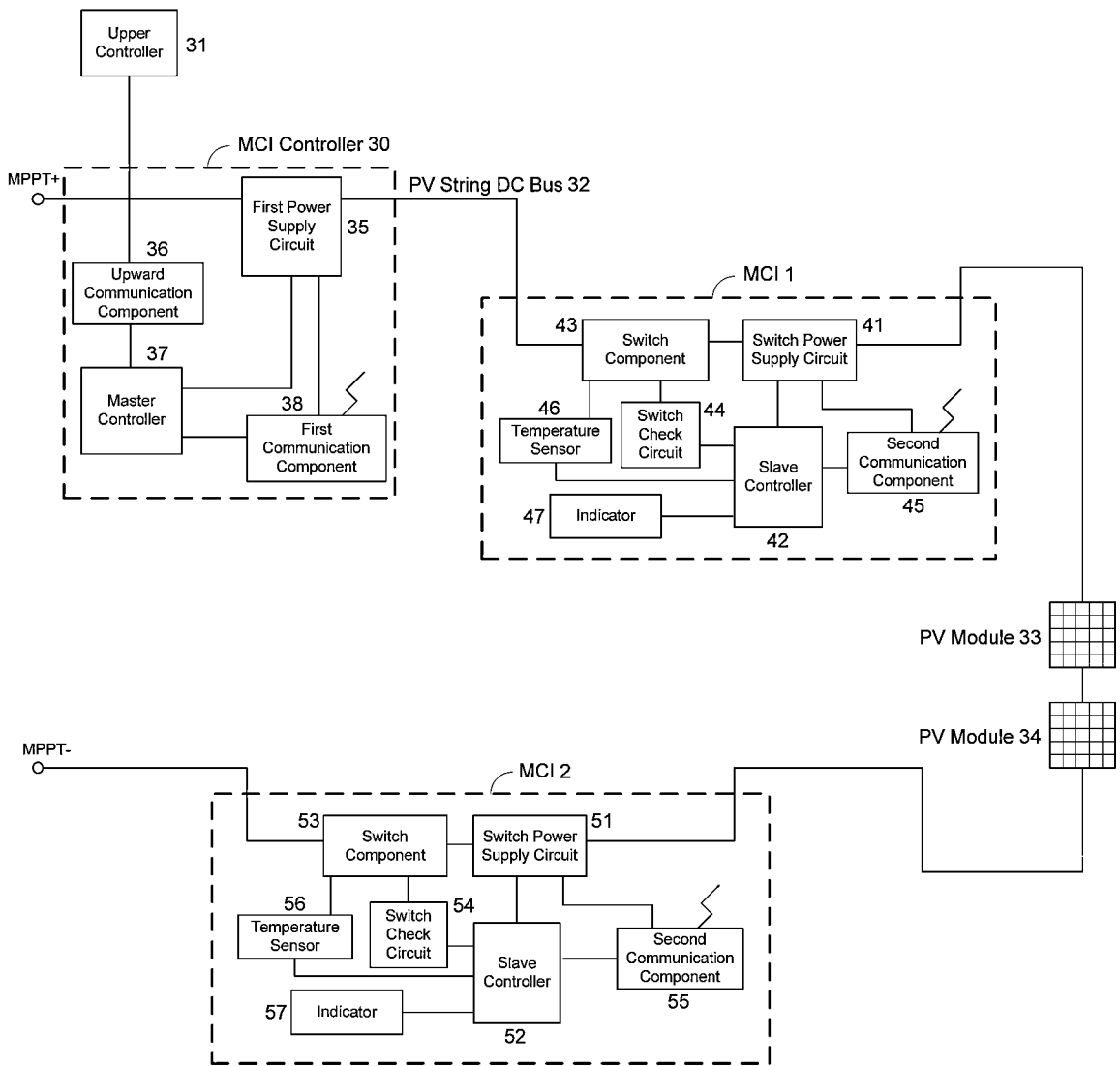
FIG. 2 shows schematically a PV shutdown system with MCIs in accordance with various embodiments of the present disclosure.

FIG. 2 illustrates schematically a PV shutdown system in accordance with the present disclosure. The PV shutdown system includes an MCI controller 30 and one or more MCIs (e.g., MCI 1 and MCI 2). The PV shutdown system is connected with an upper controller 31, a PV string DC bus 32, and a PV string that contains serially-connected PV modules, such as PV modules 33 and 34. The MCI 1 and MCI 2 each have two terminals that are connected to the MCI controller 30, an MPPT system, and the PV modules 33 and 34 directly or indirectly. The PV modules, also referred to as PV arrays, are capable of generating DC voltage from a beam of light such as a solar beam. The MCI controller 30 supplies power to the MCIs and controls the on state and off state of the MCIs by providing or stopping a high-frequency current. In some cases, the MCI 1, MCI 2, PV module 33, and PV module 34 are connected in series as depicted in FIG. 2. Optionally, other configurations may be used. For example, the MCI 1 or MCI 2 may be disposed between the PV modules 33 and 34.

The MCI controller 30 includes a first power supply circuit 35, an upward communication component 36, a master controller 37, and a first communication component 38. The upward communication component 36 communicates with the upper controller 31. The first power supply circuit 35 is configured to supply power to the MCI 1 and MCI 2, respectively. The first communication component 38 communicates with the MCIs 1 and 2, respectively.

The MCI 1 includes a switch power supply circuit 41, a slave controller 42, a switch component 43 containing a metal-oxide-semiconductor (MOS) switch and a driver, a switch check circuit 44 for checking the switch status, a second communication component 45, a temperature sensor 46, and an indicator 47. The switch power supply circuit 41 provides power to the MOS switch. The term "switch status", as used herein, indicates whether a switch works properly, such as whether the switch is properly in the on state or the off state. The switch status of the MOS switch may be used to determine the working status of the MCI 1. If the MOS switch fails, the MCI 1 is considered as defective and should be repaired or replaced. The indicator 47 may include a sound generator (e.g., a speaker) and/or a light emitter (e.g., an LED module). The second communication component 45 communicates with the first communication component 38 of the MCI controller 30, such as receiving instructions and transmitting data and information. The MCI 2 has the same structure as or a similar structure to that of the MCI 1. The MCI 2 includes a switch power supply circuit 51, a slave controller 52, a switch component 53 containing a MOS switch and a driver, a switch check circuit 54 for checking the switch status, a second communication component 55, a temperature sensor 56, and an indicator 57. The switch status may be used to determine the working status of the MCI 2. Like the second communication component 45, the second communication component 55 communicates with the first communication component 38 of the MCI controller 30. In some embodiments, the upward communication component 36, first communication component 38, and second communication components 45 and 55 may have communication functions based on wireless technologies. In some other embodiments, the upward communication component 36, first communication component 38, and second communication components 45 and 55 may have communication functions based on wired technologies.

As shown in FIG. 2, the PV string is connected to the positive and negative terminals of the MPPT, respectively. The MCI controller 30 is connected to the positive terminal of the MPPT and the PV string DC bus 32, respectively.

The PV shutdown system as illustrated in FIG. 2 contains the MCI devices 1 and 2 exemplarily. Take the MCI 1 for example. The MCI 1 is turned on when power is supplied to the MCI 1, and the MCI 1 is shut down when the power supply is terminated. The MCI 1 contains the slave controller 42 and one or more detection circuits. The detection circuits may be used to detect whether the MCI 1 is on or off and the temperature of the MCI 1, respectively. The MCI 1 also contains a communication circuit based on the second communication component 45. When the communication circuit receives the on or off status of the MCI 1 and the temperature of the MCI 1, it may transmit the results to the MCI controller 30.

The MCI controller 30 uses the upward communication component 36 and master controller 37 to communicate with the upper controller 31, transmitting and receiving data and information. The upper controller 31 may notify a user of any abnormal conditions and shutdown status for facilitating repair and replacement tasks. When the MCI controller 30 obtains a detection result indicating that the temperature at, e.g., the MCI 1, is beyond a threshold value, the MCI controller 30 may reduce the MPPT power, or directly stop power supply to shut down the MCI 1 to protect the MCI 1 and eliminate potential fire hazards.

Figure 3:
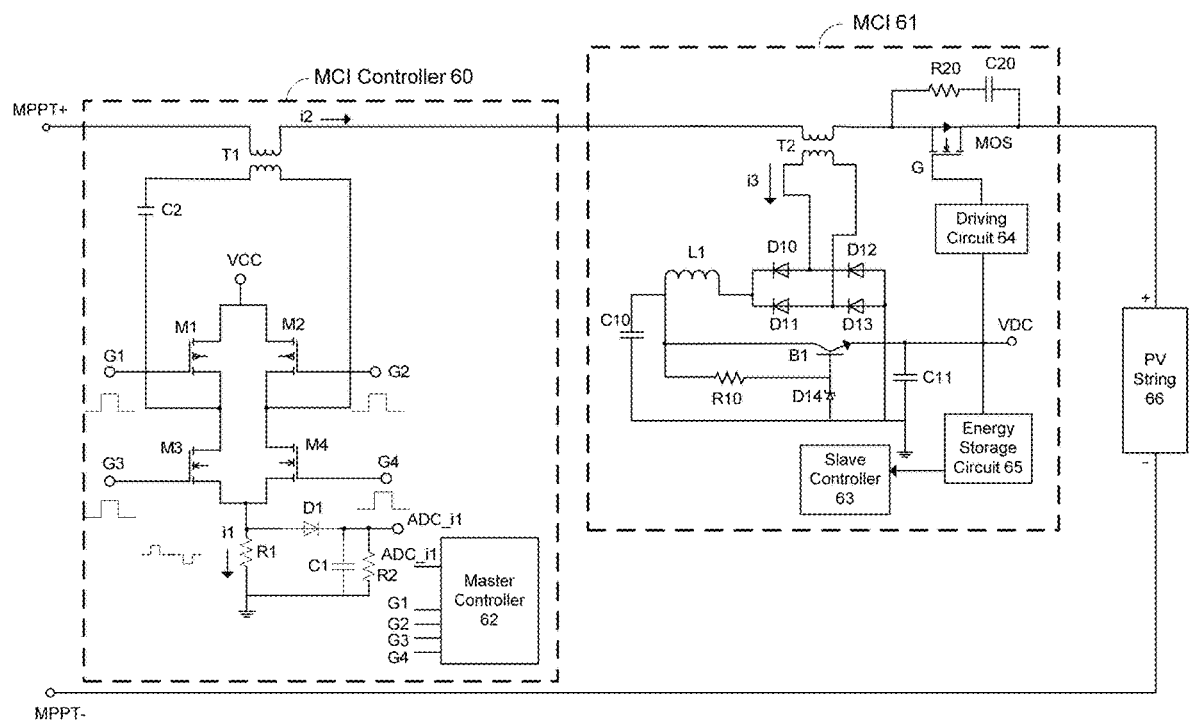
FIG. 3 shows schematically another PV shutdown system with an MCI in accordance with various embodiments of the present disclosure.

FIG. 3 illustrates schematically another PV shutdown system in accordance with the present disclosure. The PV shutdown system includes an MCI controller 60 and an MCI 61 configured for one or more PV strings, such as a PV string 66. The MCI 61 is used as an exemplary MCI. For the one or more PV strings, multiple MCIs 61 may be disposed between PV modules in the PV string or strings. The MCI controller 60 contains an MCI power supply circuit that includes a source side power loop. The power loop consists of a DC power supply VCC, a full bridge circuit M1~M4 (which may also be a half bridge circuit), a capacitor C2, and a coupling transformer T1. A resistor R1 is connected in series in the loop to detect the supply current. The gates of M1~M4 are controlled by a master controller 62. The master controller 62 sends out four sets of complementary PWM signals and generates a high-frequency AC current i1. The current i1 is coupled into the PV main circuit through the coupling transformer T1, creating a high-frequency AC current i2. The current i2 is coupled through a coupling transformer T2 at the MCI 61, generating a high-frequency AC current i3. The current i3 passes through a D10~D13 full-bridge rectifier circuit, a filter inductor L1, a capacitor C10, and a Zener triode circuit formed by a resistor R10, a transistor B1, and a Zener diode D14. As such, a stable voltage VDC is generated to power the MCI 61 for internal use.

Optionally, an energy storage circuit 65 may be set up at the MCI 61 to specifically power a slave controller 63, communication functions, and a detection circuit. Optionally, one or more rechargeable batteries may be connected to the energy storage circuit 65. When the MCI controller 60 stops supplying power, the energy storage circuit 65 may use the batteries as a power supply. Then, the energy storage circuit 65 may maintain the power for a preset period of time to facilitate detection of abnormal switch status. As such, the energy storage circuit 65 enables an internal power supply included by the MCI 61.

As shown in FIG. 3, the switching principle of the MCI 61 is as follows. At MCI 61, after a driving circuit 64 receives power, the driving circuit 64 drives a G pole of a MOS switch to a high level, and the MOS switch is turned on. When the master controller 62 stops sending the PWM signals, the MCI 61 loses power, the driving circuit 64 drives the G pole of the MOS switch to a low level, and the MOS switch is turned off. When the MOS switch is turned on, the MCI 61 is in the on state. When the MOS switch is turned off, the MCI 61 is in the off state or shutdown state.

Figure 4:
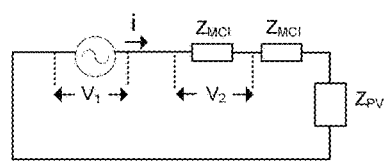
FIG. 4 shows schematically an impedance model of a power supply circuit at a PV shutdown system in accordance with various embodiments of the present disclosure.

FIG. 4 illustrates schematically an impedance model of a PV power supply circuit for a PV shutdown system in accordance with the present disclosure. An MCI power supply solution of the present disclosure provides a method to automatically adjust the power supply voltage for an MCI. Assuming an MCI controller feeds a supply current i to multiple MCIs. As shown in FIG. 4, the more MCIs and PV modules connected in series in the PV power supply circuit, the greater the impedance of the PV power loop. If the high-frequency voltage outputted by the MIC power supply remains unchanged, the greater the impedance of the PV DC bus, the smaller the supply current i, and the smaller the MCI supply voltage. When the MCI supply voltage is too low, the MCI may not work reliably. When the MCI supply voltage is too high, it may increase the system power consumption and reduce the working life of the MCI.

In order to provide reliable power supply to the MCIs, the MCI controller, i.e., an MCI main controller on the MPPT side (e.g., the master controller 62 in FIG. 3), may measure the high-frequency supply current i supplied to the MCI. The current i may be adjusted and maintained at a predetermined level (e.g., not too small and not too big) by adjusting the value of the power supply VCC of the bridge circuit (e.g., the VCC of the MCI controller 60 shown in FIG. 3) or changing the duty cycle of the PWM signals. The predetermined level of the supply current i may be optimized by calculation according to conditions of the PV shutdown system, the MPPT, and the PV modules. Optionally, the MCI controller may adjust and keep the supply voltage of the MCI in the series circuit at the optimized level and ensure that the MCI has reliable power supply.

At the PV shutdown systems as shown in FIGS. 2 and 3, communication methods may be wireless or based on wired power line communication (PLC). In some cases, the wireless communication method may be used. In some other cases, the wired PLC method may be used.

Figure 5:
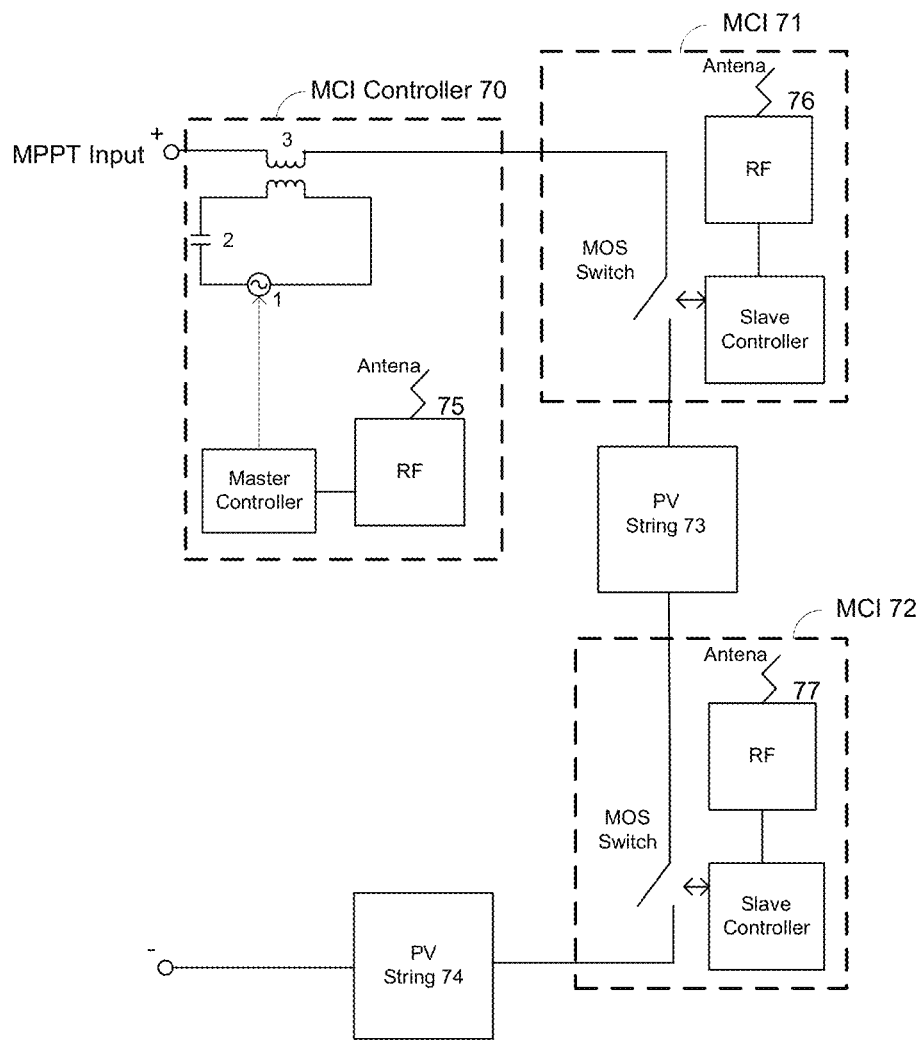
FIG. 5 shows schematically a PV shutdown system with MCIs in accordance with various embodiments of the present disclosure.

FIG. 5 illustrates schematically a PV shutdown system in accordance with the present disclosure. As shown in FIG. 5, the PV shutdown system includes an MCI controller 70 and MCIs 71 and 72. The MCI controller 70, MCIs 71 and 72, and PV strings 73 and 74 are connected in series. The MCI controller 70 contains a master controller. The MCIs 71 and 72 each contain a slave controller. The MCI controller 70 and MCIs 71 and 72 have wireless communication components 75, 76, and 77, respectively. The wireless communication components 75, 76, and 77 each may include a wireless transceiver for transmitting and receiving signals. Various wireless communication protocols may be used for the PV shutdown system, such as Wi-Fi™, ZigBee™, Bluetooth™, or cellular communications. The MCIs 71 and 72 may have structures similar to or the same as the above-described MCIs, such as MCIs 1, 2, and 61 depicted in FIGS. 2 and 3. In some embodiments, the wireless communication component 75 may be integrated with the master controller. Similarly, the wireless communication component 76 may be integrated with the slave controller at the MCI 71, and the wireless communication component 77 may be integrated with the slave controller at the MCI 72.

Figure 6:
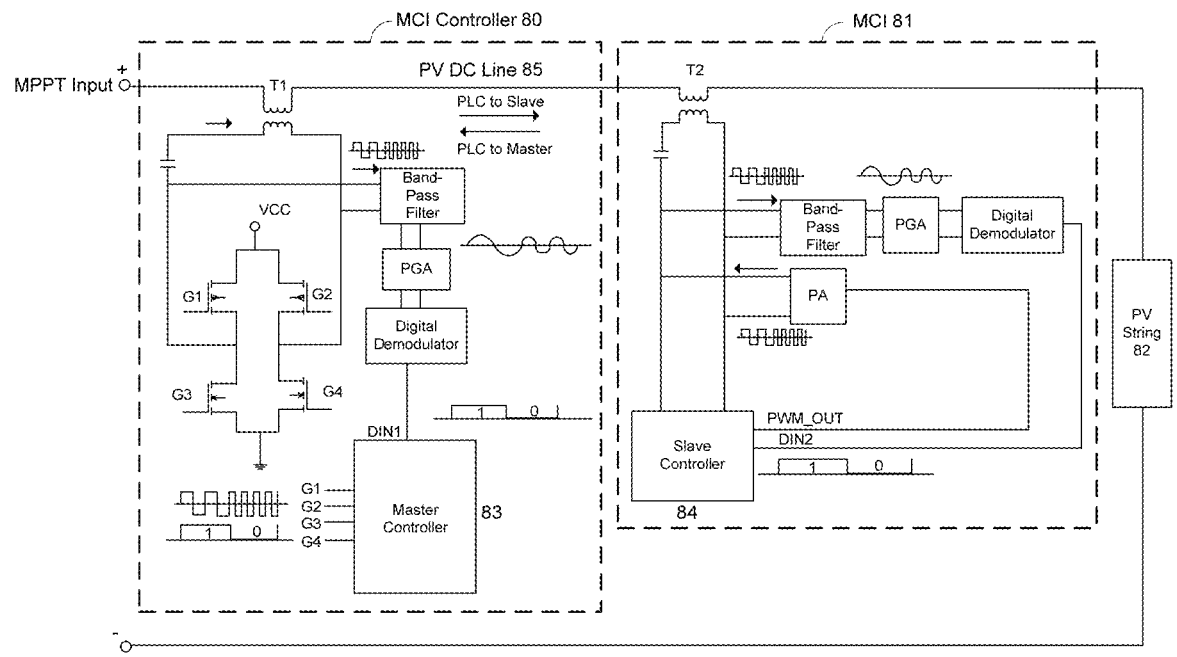
FIG. 6 shows schematically a PV shutdown system with an MCI in accordance with various embodiments of the present disclosure.

FIG. 6 illustrates schematically another PV shutdown system in accordance with the present disclosure. As shown in FIG. 6, the PV shutdown system includes an MCI controller 80 and one or more MCIs such as an MCI 81. The MCI controller 80, MCI 81, and an exemplary PV string 82 are connected in series. The MCI controller 80 has a master controller 83, while the MCI 81 has a slave controller 84. The MCI 81 may have a structure similar to the above-described MCIs, such as MCIs 1, 2, and 61 depicted in FIGS. 2 and 3. The communication between the master controller 83 and slave controller 84 may be implemented by the PLC method.

PLC is a data transmission technology that utilizes existing power lines, such as a PV DC line 85 in FIG. 6. The PV DC line 85 may be used as a transmission line to connect the master controller 83 with the slave controller 84. The communication is based on wired technology and may be more secure and reliable than the wireless techniques. In addition, even though it is wired communication, because power and data can be transmitted with a single line, no new wiring of communication cable will be needed in a network. In some cases, the master controller 83 has a transmitter and a receiver, and the slave controller 84 also has a transmitter and a receiver. During communication between the master controller 83 and the slave controller 84, the transmitter at the master controller 83 may modulate the data and superimpose the modulated signal onto the DC voltage. The receiver at the slave controller 84 then may extract the data by separating the DC voltage and the modulated signal using a filter and demodulating the modulated signal by a digital demodulator. Thus the master controller 83 and the slave controller 84 may communicate to each other through the PV DC line 85 by the PLC scheme, as illustrated schematically in FIG. 6.

Figure 7:
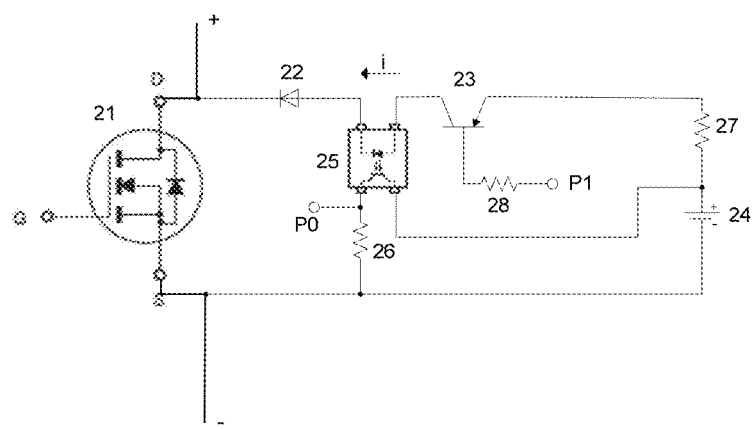
FIG. 7 shows schematically a circuit for switch status detection in accordance with various embodiments of the present disclosure.

FIG. 7 illustrates schematically a detection circuit for detecting switch status in accordance with the present disclosure. The detection circuit is configured to ascertain whether a MOS switch 21 at an MCI is in the on state or off state. Assuming that a PV shutdown system includes an MCI controller and the MCI that are similar to those illustrated above.

When the PV shutdown system requires the MOS switch 21 of the MCI to be turned on, the detection method is as follows. The MCI controller turns on the MCI power supply, and then waits for a preset period of time. After the preset period of time elapses, the MCI controller sends the MCI a detection command. The detection command directs the MCI to detect the working status of the MCI (i.e., the working status of the MOS switch 21). A slave controller of the MCI starts a detection process in response to receiving the detection command. The slave controller controls a P1 signal terminal to have a low level, and a transistor 23 is turned on. If the MOS switch 21 is on (or in the on state), it indicates the MOS switch 21 works properly. Then, there is a DC current i passing through the optocoupler 25, and the P0 terminal on the secondary side of the optocoupler 25 has a high level output. If the MOS switch 21 is in the off or high-resistance state (e.g., fault interruption), it indicates the MOS switch 21 does not work properly or fails. Consequently, the optocoupler 25 has no DC current i or a weak DC current i may pass through, and the P0 terminal on the secondary side of the optocoupler 25 may output a low level signal. The slave controller detects the level at the P0 terminal, and the detection data is transmitted to an upper level (e.g., an MCI controller). That is, the MCI sends detection results to the MCI controller after the detection process is completed.

When the PV shutdown system requires the MOS switch 21 of the MCI to be shut down (i.e., at the off state), the detection method is as follows. The MCI controller stops the MCI power supply and then waits for a given time. After the given time elapses, the MCI controller sends the MCI a detection command. The gate G terminal of the MOS switch 21 is at a low level in a short period of time. Assuming there is a specific energy storage circuit (e.g., the energy storage circuit 65 in FIG. 3) configured at the MCI. After the MCI power supply is stopped, the slave controller of the MCI still has power and starts a detection process. The slave controller controls the P1 signal terminal to have a low level, and the transistor 23 is turned on. If the MOS switch 21 is in the on state (e.g., fault conduction), the MOS switch 21 is defective. There may be a DC current i passing through the optocoupler 25, and the P0 terminal on the secondary side of the optocoupler 25 may have a high level output. If the MOS switch 21 is in the off or high-impedance state, the MOS switch 21 works properly. The optocoupler 25 has no DC current i or a weak current i passing through it, and the P0 terminal on the secondary side of the optocoupler 25 may output a low level signal. The slave controller detects the level at the P0 terminal, and the detection result is sent to the upper level.

Figures 8, 9:
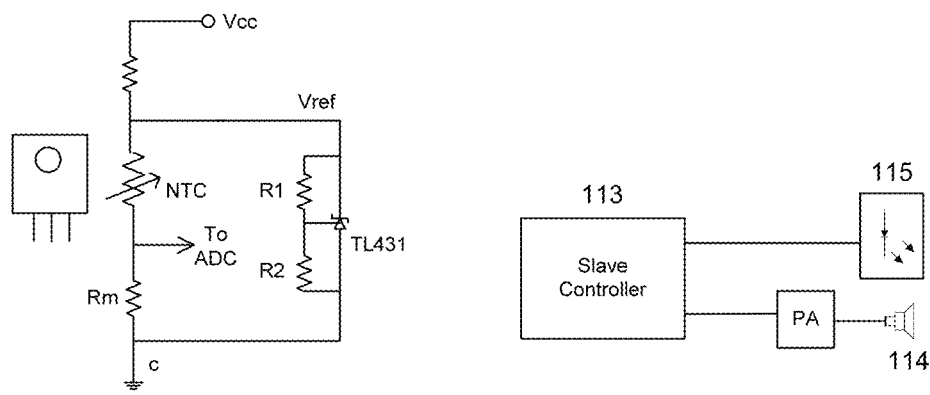
FIG. 8 shows schematically a sensing circuit for temperature detection in accordance with various embodiments of the present disclosure.
FIG. 9 is a diagram illustrating an arrangement of light and sound signal generation in accordance with various embodiments of the present disclosure.

FIG. 8 illustrates schematically a sensing circuit configuration for temperature detection in accordance with the present disclosure. Assuming that a PV shutdown system includes an MCI controller and an MCI that are similar to the MCI controllers and MCIs illustrated above. The MCI has a slave controller. Further, there is also an MPPT system with which the PV shutdown system is connected. The sensing circuit is arranged to detect whether a MOS switch at the MCI is overheated. The on status and off status of the MOS switch determines the on status and off status of the MCI.

As shown in FIG. 8, a temperature sensor (e.g., an NTC thermistor) is disposed near a heat sink of the MOS switch to sample the temperature of the MOS switch. Resistors R1 and R2 and a three-terminal adjustable shunt regulator TL431 are used to provide a standard voltage reference $V_{ref}$. Rm is a resistance measuring resistor. The voltage $V_{Rm}$ at the two ends of the resistor Rm is sent to the ADC terminal of the slave controller. The voltage $V_{Rm}$ is measured. Then, the current $i_{Rm}$ flowing through the NTC is calculated. The voltage across the NTC may be calculated by $V_{NTC}=V_{ref}-V_{Rm}$. The impedance value of the NTC may be calculated by $RNTC=V_{ntc}/i_{Rm}$. By calculating using the impedance and a table, the temperature of the MOS switch may be obtained. Values of the measured temperature are reported to an MPPT controller through one of the above-mentioned communication methods. When the temperature of the MOS switch is too high, the heating of the MOS switch may be reduced by reducing the PV input current. For example, when the temperature of the MOS switch exceeds a preset threshold, the MPPT input circuit power may be reduced or the MCI may be shut down to protect the MOS switch from being overheated.

In some embodiments, the temperature of the MOS switch may be measured periodically, which may be arranged as a routine test to monitor the switch status using the temperature. Optionally, the temperature of the MOS switch may be measured when it is detected the MOS switch malfunctions or fails. In such cases, measurements of the temperature may be used to assist failure analysis.

FIG. 9 is a diagram illustrating an arrangement of light and sound signal generation in accordance with the present disclosure. Assuming a PV shutdown system includes an MCI controller and multiple MCIs. Each MCI has a slave controller 113. Since the PV shutdown system is placed on a roof along with PV modules and the MCIs are disposed under the PV modules, it is difficult to locate a faulty one among the MCIs. As shown in FIG. 9, a speaker/buzzer 114 and an LED 115 are provided at each MCI. When it is detected that an MCI malfunctions or has failed, a maintenance personnel may issue a command by operating an APP to put the MCI into a fault indication state. At this time, the faulty MCI may turn on the speaker/buzzer 114 and LED 115, and generate sound and light as a signal to help the maintenance personnel on the roof find the location of the faulty MCI.

Optionally, the speaker/buzzer 114 may generate a sound with a frequency range of 1000~4000 Hz, which the human ear is most sensitive to. In some embodiments, the interaural time difference (ITD) effect may be utilized. When a high frequency sound input is used with a frequency greater than 1500 Hz, the wavelength is shorter than the distance between the two ears of a user. As such, a head shadow is produced and the ILD effect may provide cues for the user to identify the location of the sound more conveniently. For example, the speaker/buzzer 114 may be arranged to produce a sound with a central frequency of 2000 Hz.

Figure 10:
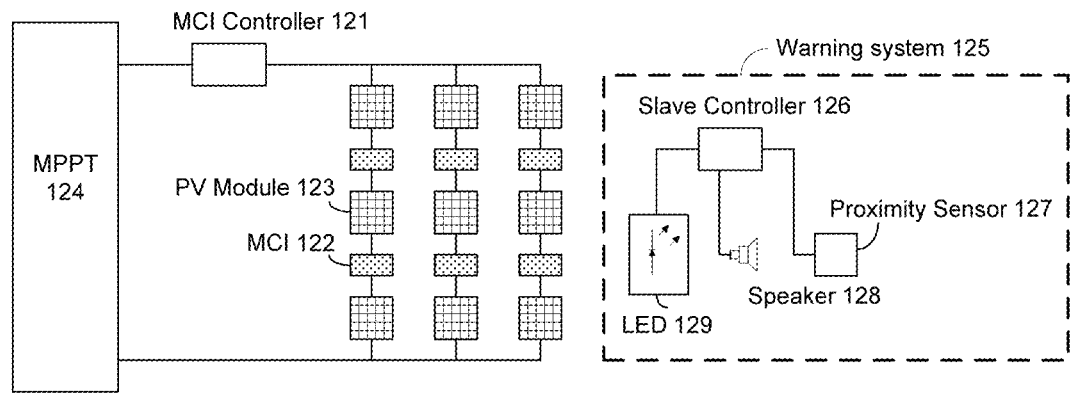
FIG. 10 is a diagram illustrating a PV power generation system with a setup of warning signal generation in accordance with various embodiments of the present disclosure.

FIG. 10 is a diagram illustrating a PV power generation system 120 with a warning system in accordance with the present disclosure. Assuming the PV power generation system 120 includes an MCI controller 121, MCIs 122, PV modules 123, and an MPPT system 124. The MCI controller 121 and MCIs 122 are similar to those illustrated above. The PV modules 123 forms PV strings and the PV strings are connected in parallel. In a PV string, the MCIs are connected with the PV modules in series.

The system 120 further includes a warning system 125 that contains a slave controller 126, a proximity sensor 127, a speaker 128, and an LED 129. Optionally, the warning system 125 may have its own power supply such as a rechargeable battery module. The slave controller 126 controls the proximity sensor 127, speaker 128, and LED 129. Optionally, the slave controller 126 may be replaced by the MCI controller 121 or a controller at the MPPT 124.

The proximity sensor 127 may include one or more of a visible light imager (or camera), an infrared imager (or camera), and a radar system such a millimeter wave radar that may penetrate through smoke plumes. The warning system 125 may have multiple proximity sensors 127, especially when the PV modules 123 cover a large area. The camera may be a video camera (e.g., a security camera) that is capable of recording video clips. The images and video clips taken by the camera may be analyzed by a specific algorithm to determine whether a person approaches the PV modules 123. The speaker 128 and the LED 129 are used as warning signal generators. The warning signals may include sound and light. When it is detected that a person approaches and is within a short distance (e.g., 1-3 meters) from the edge of the PV modules 123, the slave controller 126 turns on the speaker 128 and the LED 129 to generate audible warning signals and light warning signals, warning the approaching person of shock risks. The audible warning signals may include buzzing noise. Optionally, the audible warning signals may include audible messages, such as "Danger, keep a distance", "Beware of high voltage", or "Mind solar panels". The LED 129 may be replaced by one or more lasers to increase the intensity of the warning light in some cases. Optionally, the LED 129 may emit white, blue, and red flashes sequentially. The warning system 125 may be turned on or off by a user.

Optionally, the warning system 125 may have two operational modes for a user to select to meet different needs. The two operational modes may include an always-on mode and a triggered mode. In the always-on mode, the warning system 125 is kept on all the time, always alerting people approaching it. In the triggered mode, the warning system 125 is triggered to turn on when an MCI 122 fails or does not work properly, while the warning system 125 remains in the off state when the working status of all of the MCIs 122 is normal (i.e., each MCI 122 works properly). The always-on mode may be suitable at some residential sites, where the PV power generation system 120 is accessible for ordinary people. The triggered mode may be used at some non-residential sites, such as certain institutional sites and industrial sites, where usually trained personnel have access to the system 120. The triggered mode allows technicians to access the system 120 without being bothered by warning signals when the system 120 is in the normal state. Optionally, other operational modes may also be used at the warning system 125, such as a scheduled mode where the on state and off state of the warning system 125 are predetermined and set up in advance. The warning system 125 may protect ordinary people, service personnel, as well as firefighters.

Figure 11:
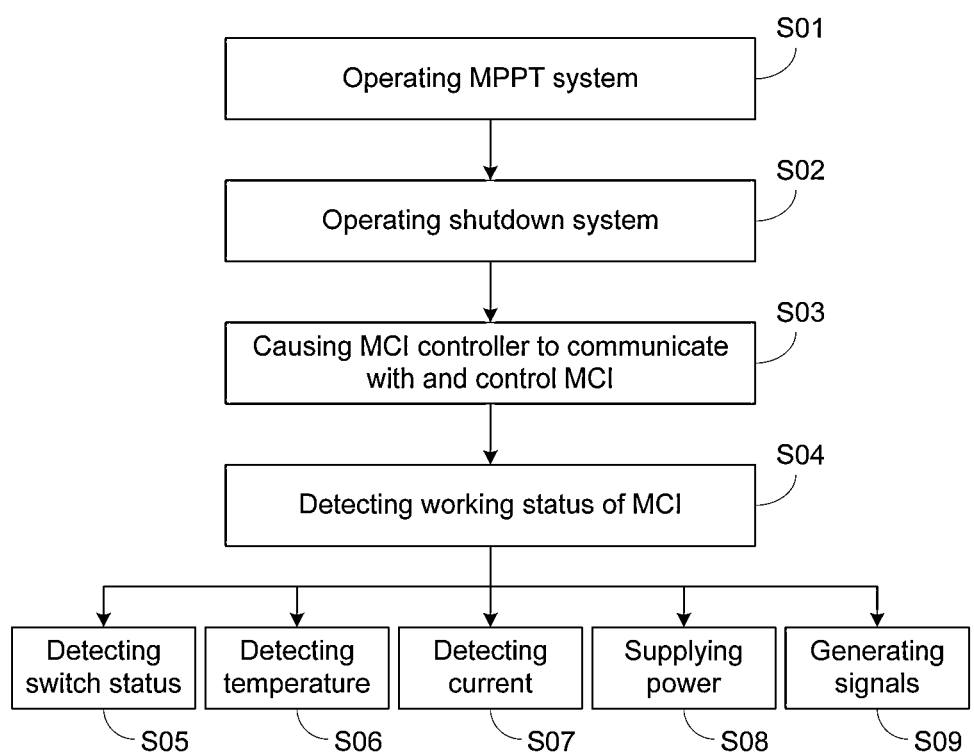
FIG. 11 illustrates exemplary methods for a PV power generation system in accordance with various embodiments of the present disclosure.

FIG. 11 shows a schematic flow chart to illustrate methods for a PV power generation system according to the present disclosure. The PV power generation system contains an MPPT system, a shutdown system, and PV strings formed by PV modules. The shutdown system has MCIs (e.g., the MCI 1 or 61 shown in FIGS. 2 and 3) and an MCI controller (e.g., the MCI controller 3 or 60 shown in FIGS. 2 and 3. At S01, the MPPT system is operated to manage the PV power generation system. At S02, the shutdown system is in operation. At S03, the MCI controller is arranged to communicate with the MCIs, respectively. Wireless communication methods may be used. Optionally, the PLC method may also be employed for communication. The MCI controller also implements tasks to control the MCIs, such as turning on the MCIs.

At S04, the MCI controller may detect the working status of one or more MCIs. For example, after the MCIs are shut down at the PV power generation system, the MCI controller may send orders to the MCIs, instructing the MCIs to check their working status, respectively. As such, the MCI controller may ascertain which MCI becomes defective. For example, if an MCI is on after a turn-off instruction is issued or is off after a turn-on instruction is issued, this MCI is defective. In some cases, performing S04 includes performing S05 and/or S06, which are illustrated below.

At S05, the switch status of a switch (e.g., the MOS switch 21 shown in FIG. 7) of an MCI is detected. In some cases, the circuit shown in FIG. 7 may be used to detect the switch status. The switch status may be used to determine the working status of the MCI. If the switch works properly, the MCI works properly. If the switch fails, the MCI fails.

At S06, the temperature of the switch is measured using a temperature sensor. In some cases, a sensing circuit such as the circuit shown in FIG. 8 may be used to measure the temperature. If the temperature is beyond a given value, the switch may be overheated and damaged. To prevent overheating incidents, the power of the MCI may be reduced in response to detection of abnormal high temperatures. In some cases, the MCI may be turned off to cool down the switch.

At S07, a high-frequency current is detected using methods similar to that shown in FIG. 4. The supply voltage of the MCI may be adjusted by changing the high-frequency current. In some cases, the high-frequency current is adjusted and kept in a given range. It improves the reliability of the MCI and reduces power consumption.

At S08, an energy storage device (e.g., the energy storage circuit 65 shown in FIG. 3) is used to supply power to an MCI. For example, when an MCI loses power due to an incident or test arrangement, the energy storage device may work as an emergency power supply circuit to provide power for the MCI for a given time period (e.g., 1 minute). The MCI may detect the switch status of a corresponding switch and then transmit detection results to the MCI controller in the given time period. Thereafter, the MCI controller may check whether the switch is in the desired state that matches an instruction issued by the MCI controller. As aforementioned, the switch status may indicate or represent the working status of the MCI in some cases. If the switch state matches the instruction, the MCI controller determines the MCI functions properly. If the switch state does not match the instruction, the MCI controller determines the MCI malfunctions. The MCI may also perform other tasks, such as measuring and reporting the temperature of the switch in the given time period.

At S09, a sound generating component (e.g., a speaker) and a light emitting component (e.g., an LED or laser) are used to generate sound and light signals. For example, when an MCI fails, the MCI controller may cause the speaker and LED of the faulty MCI to emit sound and light signals. Such signals help a repair technician locate the faulty MCI.

Optionally, an MCI may be controlled by an MCI power supply circuit (e.g., the first power supply circuit 35 shown in FIG. 2). When the MCI power supply is provided, the MCI is turned on. When the MCI power supply is off, the MCI is turned off. In some embodiments, S05-S09 may be implemented respectively after S04 is performed. In some other embodiments, S05-S09 may be implemented respectively before S04 is performed.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. A photovoltaic (PV) shutdown system for a PV power generation system, comprising:
    a mid-circuit interrupter (MCI) controller; and
    at least one MCI with two terminals, wherein the two terminals of the at least one MCI are arranged for connection with the MCI controller, a maximum power point tracking (MPPT) system, and a PV string, the PV string includes a plurality of PV modules connected in series, and the MCI controller is arranged to turn on the at least one MCI by providing supply power and turn off the at least one MCI by terminating the supply power, wherein the at least one MCI comprises:
        a switch power supply circuit;
        a slave controller;
        a switch component;
        a switch check circuit for detecting working status of the at least one MCI; and
        a second communication component for communicating with the MCI controller.

2. The PV shutdown system according to claim 1, wherein the at least one MCI is arranged to detect working status of the at least one MCI after receiving an instruction from the MCI controller and transmit a detection result to the MCI controller.

3. The PV shutdown system according to claim 1, wherein the MCI controller comprises:
    an MCI power supply circuit for supplying power to the at least one MCI;
    a master controller; and
    a first communication component for communicating with the at least one MCI.

4. The PV shutdown system according to claim 3, wherein the MCI controller further comprises:
    an upward communication component for communicating with an upper controller.

5. The PV shutdown system according to claim 1, wherein the at least one MCI further comprises:
    a temperature sensor for detecting temperature of the switch component.

6. The PV shutdown system according to claim 1, wherein the at least one MCI further comprises:
    an indicator for generating a sound and/or light signal when the at least one MCI malfunctions.

7. The PV shutdown system according to claim 1, wherein the at least one MCI further comprises:
    an energy storage circuit, wherein the energy storage circuit is arranged to supply power to the slave controller, the switch check circuit, and/or the second communication component for a predetermined period of time after the MCI controller stops supplying power to the at least one MCI.

8. The PV shutdown system according to claim 7, wherein the at least one MCI is arranged to detect working status of the at least one MCI and send a detection result to the MCI controller using power supplied by the energy storage circuit.

9. The PV shutdown system according to claim 1, wherein the MCI controller is arranged to adjust a current supplied to the at least one MCI to maintain the current at a preset level.

10. A method for a photovoltaic (PV) shutdown system, comprising:
    supplying power to a mid-circuit interrupter (MCI) by an MCI controller to turn on the MCI or stopping supplying power to the MCI to turn off the MCI;
    in response to supplying power to the MCI or stopping supplying power to the MCI, waiting for a predetermined period of time; and
    after the predetermined period of time elapses, sending an instruction to the MCI, the instruction directing the MCI to detect working status of the MCI, wherein the method further comprising:
    after the MCI controller stops supplying power to the MCI, using an internal power supply at the MCI to detect temperature at the MCI.

11. The method according to claim 10, further comprising:
    after the MCI receiving the instruction, detecting the working status of the MCI; and
    transmitting a detection result to the MCI controller.

12. The method according to claim 11, further comprising:
    after receiving the detection result from the MCI, determining whether the working status of the MCI matches the instruction.

13. The method according to claim 10, further comprising:
    after the MCI controller stops supplying power to the MCI, using an internal power supply at the MCI to detect the working status of the MCI and send a detection result to the MCI controller.

14. The method according to claim 10, further comprising:
    generating a sound signal and/or a light signal when the MCI malfunctions.

15. A photovoltaic (PV) power generation system, comprising:
    a maximum power point tracking (MPPT) system;
    a mid-circuit interrupter (MCI) with two terminals;
    an MCI controller; and
    a PV string, the PV string including a plurality of PV modules connected in series, wherein the two terminals of the MCI are connected with the MCI controller, the MPPT system, and the PV string, the MCI controller is arranged to turn on the MCI by providing supply power and turn off the MCI by terminating the supply power, and the MCI is arranged to detect working status of the MCI after receiving an instruction from the MCI controller and transmit a detection result to the MCI controller.

16. The PV power generation system according to claim 15, wherein the MCI comprises:

an energy storage circuit, wherein the energy storage circuit is arranged to supply power to the MCI after the MCI controller stops supplying power to the MCI.

17. The PV power generation system according to claim 15, further comprising:

a warning system including:
  a proximity sensor; and
  a warning signal generator, wherein the warning signal generator generates a sound signal and/or a light signal when it is detected a person approaches one of the plurality of PV modules through the proximity sensor.

* * * * *